United States Patent
Häsler et al.

[11] Patent Number: 6,146,043
[45] Date of Patent: Nov. 14, 2000

[54] DEVICE FOR CONNECTING TWO COMPONENTS

[75] Inventors: Georg Häsler, Nagold; Karl Kuppler, Rohrdorf, both of Germany

[73] Assignee: Häfele GmbH & Co., Nagold, Germany

[21] Appl. No.: 09/104,319

[22] Filed: Jun. 25, 1998

[30] Foreign Application Priority Data

Jun. 25, 1997 [DE] Germany ................. 297 11 066 U

[51] Int. Cl.[7] ................................................ F16B 5/02
[52] U.S. Cl. ................................................ 403/8; 403/231
[58] Field of Search .......................... 403/6, 7, 8, 230, 403/231, 245, 409.1, 408.1

[56] References Cited

U.S. PATENT DOCUMENTS

| | | | |
|---|---|---|---|
| 4,089,614 | 5/1978 | Harley | 403/231 X |
| 4,360,282 | 11/1982 | Koch | 403/231 X |
| 4,408,923 | 10/1983 | Kubler | 403/231 X |
| 4,502,810 | 3/1985 | Nock | 403/231 |
| 4,530,614 | 7/1985 | Ruter | 403/7 |
| 4,576,506 | 3/1986 | Rock et al. | 403/245 X |
| 4,664,548 | 5/1987 | Brinkmann | 403/231 X |
| 4,756,637 | 7/1988 | Walz | 403/231 |
| 4,826,345 | 5/1989 | Salice | 403/231 |
| 4,957,386 | 9/1990 | Harley et al. | 403/231 |
| 5,096,324 | 3/1992 | Harley | 403/231 X |

*Primary Examiner*—Harry C. Kim
*Attorney, Agent, or Firm*—Friedrich Kueffner

[57] ABSTRACT

A device for connecting two components, particularly furniture plates, includes a cup-shaped assembly element and an actuating element rotatably mounted in the assembly element, wherein the actuating element serves to hold a connecting element in the assembly element, and wherein, in the mounted state of the assembly element, the actuating element can be turned from the outside by a tool. The cup-shaped assembly element has a guide duct which extends obliquely relative to the axis of rotation of the actuation element and is directed toward the actuating element. The guide duct through which the tool is to be introduced for turning the actuating element provides the person carrying out the assembly with the precise position of the screwdriver relative to the actuating element.

9 Claims, 3 Drawing Sheets

DEVICE FOR CONNECTING TWO COMPONENTS

BACKGROUND OF THE INVENTION

1. Field of the Invention

The present invention relates to a device for connecting two components, particularly furniture plates. The device includes a cup-shaped assembly element and an actuating element rotatably mounted in the assembly element, wherein the actuating element serves to hold a connecting element in the assembly element, and wherein, in the mounted state of the assembly element, the actuating element can be turned from the outside by means of a tool.

2. Description of the Related Art

In known connecting devices of the above-described type for fastening two furniture plates extending at a right angle relative to each other, a connecting element at the first furniture plate engages in a cup-shaped assembly element arranged at the second furniture plate. The connecting element is held and tightly clamped in the cup-shaped assembly element by means of an actuating element arranged in the assembly element, wherein the actuating element is engaged by the connecting element and is preferably pulled even further into the interior of the assembly element by the connecting element.

In the known connecting devices, with the actuating element being in the mounted state, the cup-shaped assembly element can be rotated from the outside by means of a tool, usually a crossrecess screwdriver, by inserting the screwdriver into a cross recess-type receiving means in the actuating element. Because of the presence of the furniture plates, the screwdriver can frequently not be placed parallel to the axis of rotation of the actuating element and, thus, the screwdriver can frequently only be positioned obliquely relative to the axis of rotation. To make it possible that the screwdriver can still sufficiently engage in the cross recess as much as possible in any angular position, the shape of the cross recess in the actuating element is configured for a large angle range and, thus, constitutes only a compromise in any possible angle position. Because of this shape of the cross recess, the person assembling the connecting device is not provided with an exact oblique position of the screwdriver when turning the actuating element, so that increased attention is required to ensure that the screwdriver does not slide out of the receiving means of the actuating element when the actuating element is turned.

SUMMARY OF THE INVENTION

Therefore, it is the primary object of the present invention to further develop a connecting device of the above-described type in such a way that the manipulation thereof during turning of the actuating element can be improved.

In accordance with the present invention, the cup-shaped assembly element has a guide duct which extends obliquely relative to the axis of rotation of the actuation element and is directed toward the actuating element.

This guide duct through which the tool is to be introduced for turning the actuating element provides the person carrying out the assembly with the precise position of the screwdriver relative to the actuating element. The diameter of the guide duct is adapted with as little play as possible to the tool to be inserted. For example, the diameter of the guide duct may correspond to the diameter of a shaft of a screwdriver. As a result, the screwdriver is exactly guided in the guide duct and, when the screwdriver is turned, it cannot slide out of the actuating receiving means, so that the person carrying out the assembly only has to concentrate on turning the screwdriver. The guide duct does not have to be a throughopening which is closed circumferentially, but may also have a slotted circumferential wall which is open on one side, for example, if this is useful for reasons of manufacturing technology.

In accordance with a particularly preferred embodiment with respect to manufacturing technology, the guide duct is formed by a throughbore in the outer wall of the cup-shaped assembly element. Accordingly, the assembly element may be constructed, for example, as an injection molded article in which the throughbore is already present, or as a metal piece in which the throughbore is manufactured separately.

In order to be able to insert the tool into the guide duct as much as possible without tilting or misalignment and to be able to guide the tool within the guide duct during turning of the tool, the guide duct has a length of at least 3 mm, preferably at least 4 mm.

In accordance with a preferred embodiment of the invention, the guide duct extends inclined at an angle of up to about 30°, preferably up to about 22°, relative to the axis of rotation of the actuating element. Because the tool is guided within the guide duct, a greater inclination angle of the tool than in the past is possible, and thus, the manipulation of the connecting device is additionally improved. In principle, any inclination of the tool of up to about 25° can be preset by the guide duct.

In accordance with another embodiment, the guide duct extends along its front circumferential portion as seen in the direction of insertion of the tool approximately parallel to the axis of rotation of the actuating element. As a result, a tool, for example, in the form of a screwdriver having a conically tapered actuating tip, can now be guided at the shaft thereof on the inclined rearward circumferential portion and at the front circumferential portion at its actuating tip which extends because of the inclined position of the screwdriver approximately parallel to the axis of rotation of the actuating element.

In order to make the turning of the actuating element by means of a tool even more comfortable, a particularly preferred embodiment of the invention provides that the actuating element has a receiving means for receiving the tool which is obliquely guided in the guide duct. Since the inclined position of the tool relative to the actuating element or to the receiving means thereof is exactly predetermined, the shape of the actuating receiving means does not have to be adapted to a large angle range as was necessary in the past, but can be configured specifically in accordance with the predetermined inclined position of the tool.

In accordance with a particularly advantageous further development of this embodiment, the actuating receiving means may be configured as a cross recess in alignment with the axis of the guide duct, wherein the slots of the cross recess are configured specifically for receiving a screwdriver which is positioned obliquely.

In accordance with a preferred feature, the front slot arm of the cross recess in the direction of insertion of the tool is open toward the front in the direction of insertion, which further contributes to the miniaturization of the actuation element.

The various features of novelty which characterize the invention are pointed out with particularity in the claims annexed to and forming a part of the disclosure. For a better understanding of the invention, its operating advantages, specific objects attained by its use, reference should be had

DESCRIPTION OF THE PREFERRED EMBODIMENTS

Figure 1:
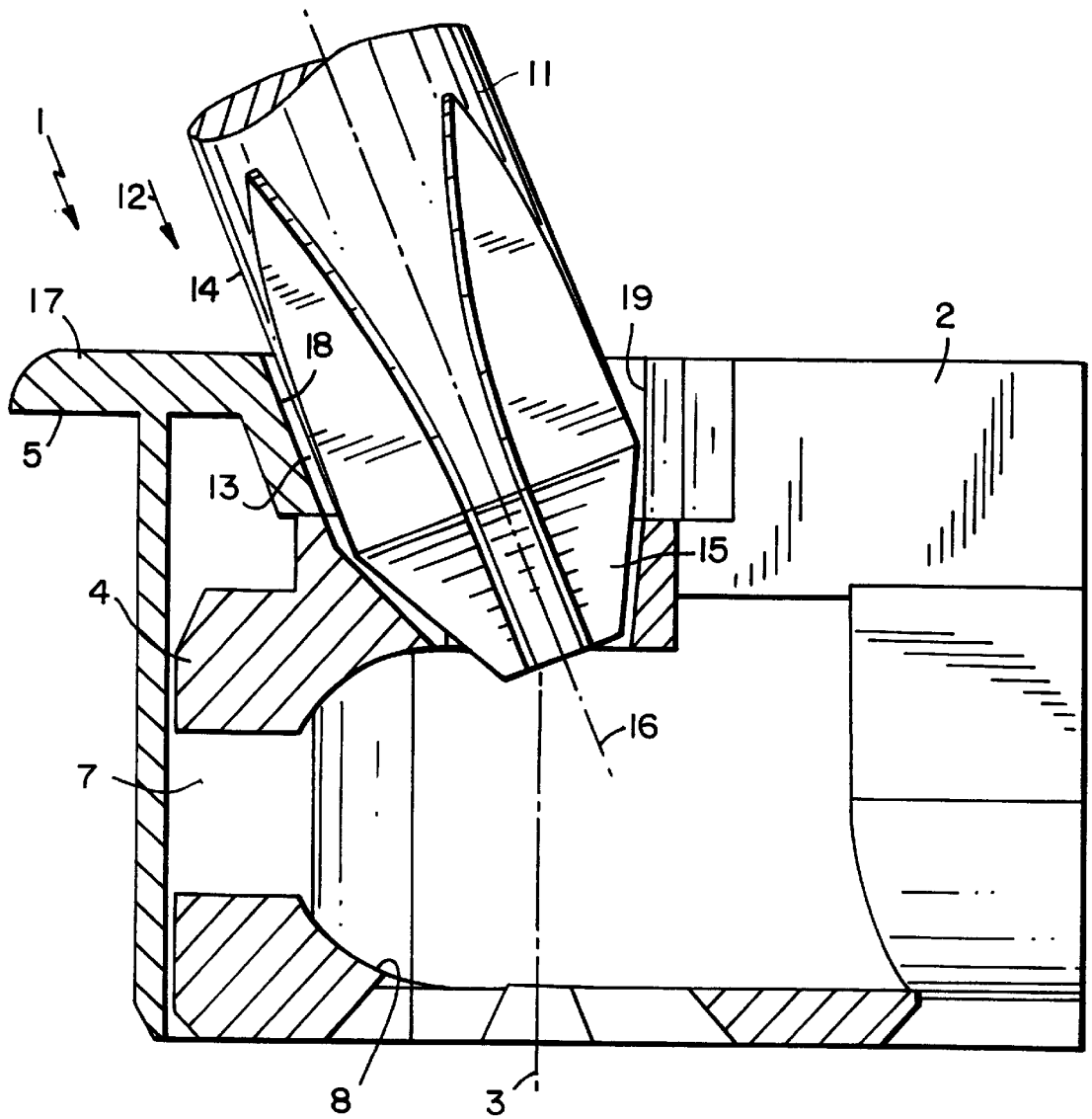
FIG. 1 is a longitudinal sectional view of the connecting device according to the present invention.
Figure 2:
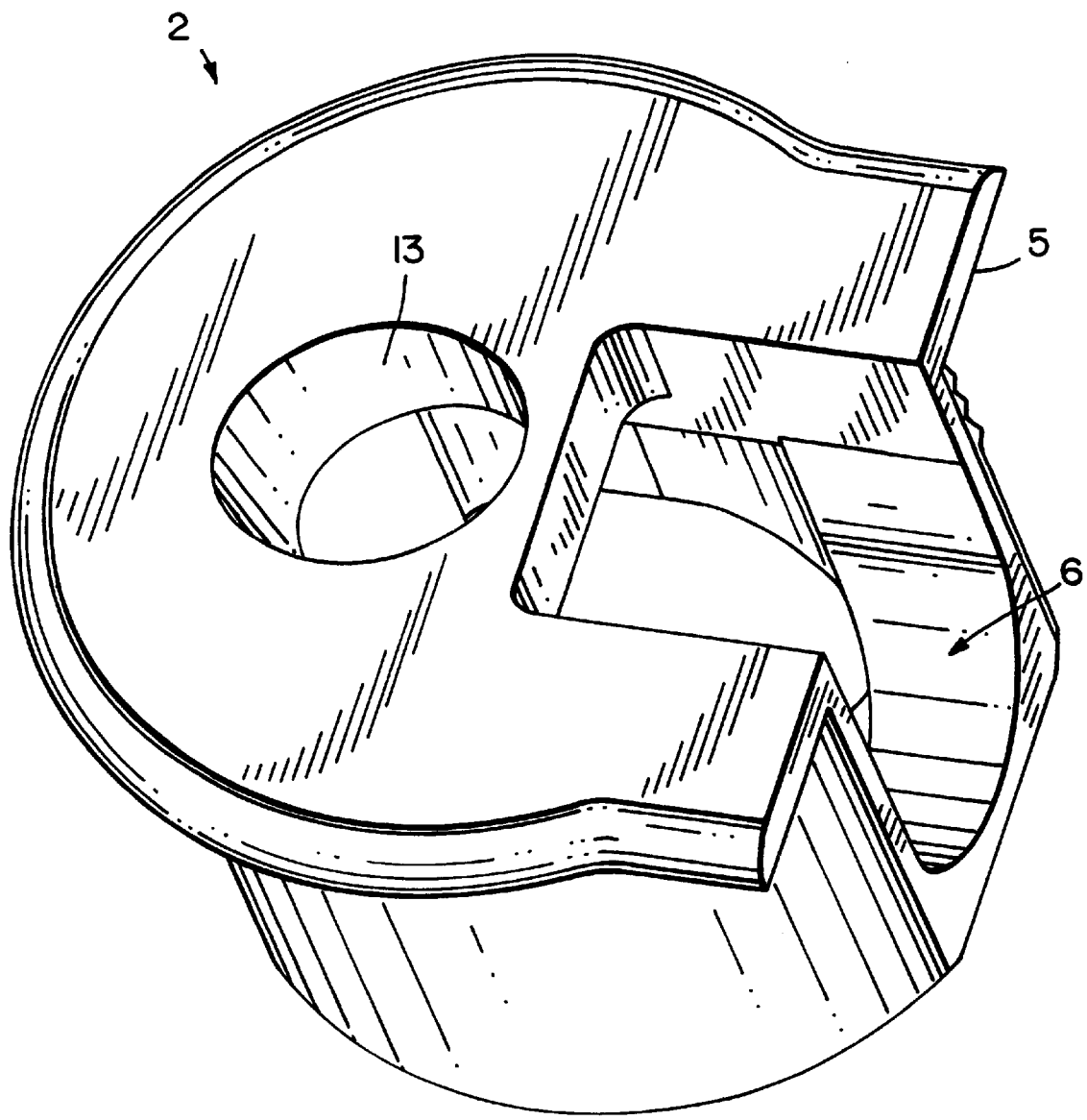
FIG. 2 is a perspective view of a cup-shaped assembly element of the connecting device of FIG. 1.

FIG. 1 of the drawing shows a connecting device 1 which can be used for connecting two furniture plates. The connecting device 1 includes a cup-shaped assembly element 2 and an actuating element 4 mounted in the assembly element 2 so as to be rotatable about an axis of rotation 3.

The assembly element 2 is inserted in an appropriate bore of the first furniture plate until making contact with the rim 5, and a connecting element, not shown, of the second furniture plate engages through a connecting receiving means 6 into the interior of the assembly element 2. By turning the actuating element 4, this connecting element is held in the assembly element 2 as a result of the opening 7 now being reduced as compared to the connecting receiving means 6 and, because of an inclined inner surface 8 of the actuating element 4, the connecting element is additionally tensioned in the direction toward the axis of rotation 3.

In order to be able to turn the actuating element 4 when the assembly element 2 is mounted in the first furniture plate, the actuating element 4 has an actuating receiving means 9 in the form of a cross recess 10, wherein a screwdriver 11 can be inserted from the outside at an inclined angle in the direction of insertion 12.

For guiding this obliquely positioned screwdriver 11, the assembly element 2 has as guide duct 13 which extends obliquely relative to the axis of rotation 3 and is directed toward the actuating receiving means 9. Through this guide duct 13, the shaft 14 of the screwdriver 11 or its cross-shaped actuating tip 15 can be inserted with little play and can be turned in a guided manner. As this is done, the actuating receiving means 9 is aligned in the direction of the axis 16 of the guide duct 13, i.e., the shape of the actuating receiving means 9 is adapted to the inclined position of the screwdriver 11 predetermined by the guide duct 13 and the actuating tip 15.

The guide duct 13 is formed in the outer wall 17 of the assembly element 2 forming the rim 5. In the illustrated embodiment, the length of the guide duct 13 is about 4 mm. Also, in the illustrated embodiment, the axis 16 of the guide duct extends inclined by about 20° relative to the axis of rotation 3 of the actuating element 4.

Figure 3:
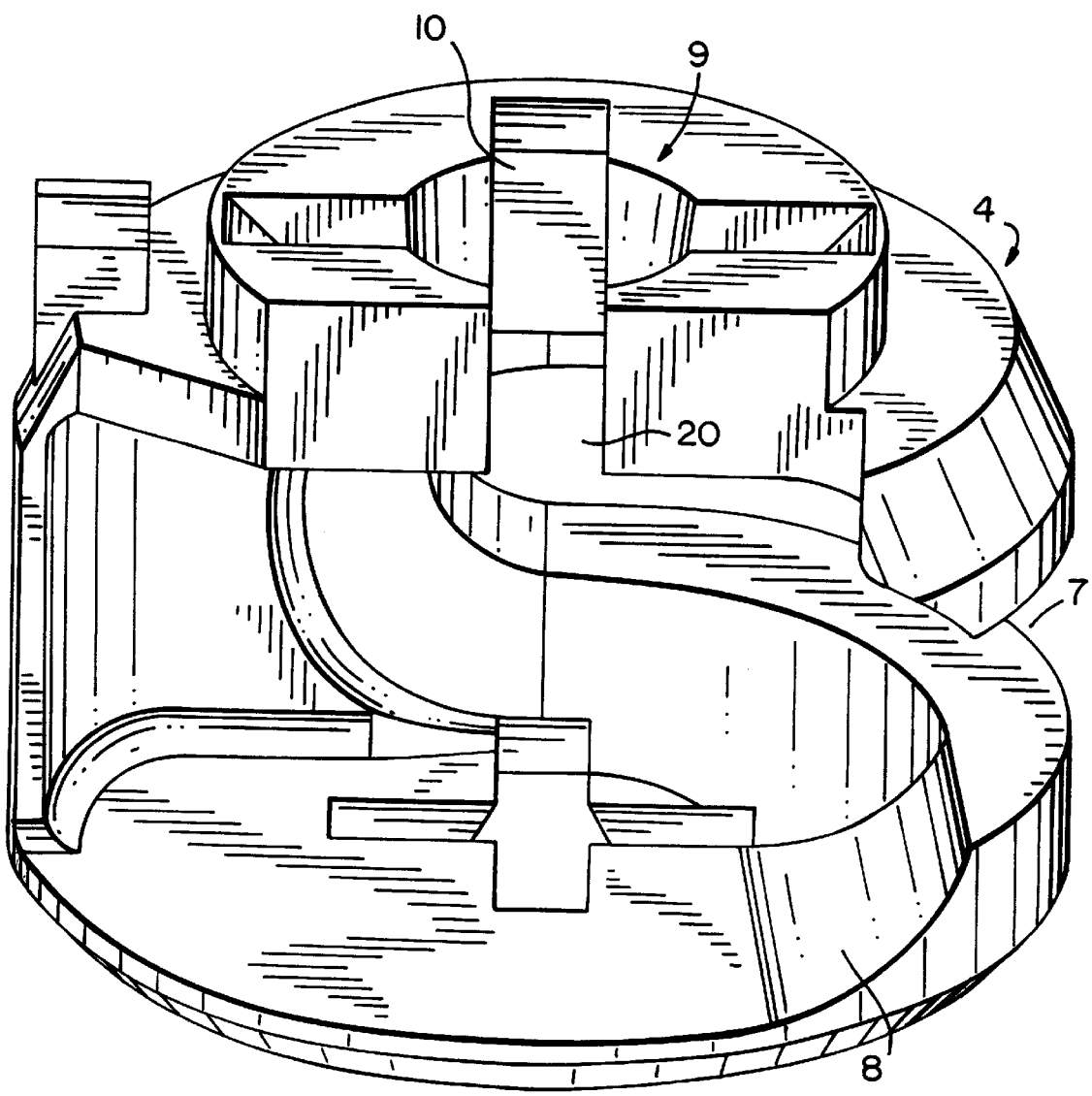
FIG. 3 is a perspective view of an actuating element of the connecting device of FIG. 1

As illustrated in FIG. 1, the shaft 14 of the screwdriver 11 is not guided in the guide duct 13 over the entire circumference thereof; rather, the screwdriver 11 rests in the guide duct 13 with its shaft 14 against the circumferential portion 18 of the guide duct 13 at the rear in the direction of insertion 12 and with its actuating tip 15 against the front circumferential portion 19. As shown in FIG. 3, the front slot 20 of the cross recess 10 as seen in the direction of insertion 12 of the screwdriver 11 is laterally open toward the front in the direction of insertion 12. In all embodiments, the inclined position of the screwdriver 11 is exactly predetermined by the guide duct 13.

While specific embodiments of the invention have been shown and described in detail to illustrate the inventive principles, it will be understood that the invention may be embodied otherwise without departing from such principles.

We claim:

1. A device for connecting two components comprising a cup-shaped assembly element and an actuating element mounted in the assembly element so as to be rotatable about an axis of rotation, wherein the actuating element is adapted for holding a connecting element in the assembly element, wherein, in a mounted state of the assembly element, the actuating element is adapted to be turned by an external tool having an actuating tip, and wherein the assembly element has a guide duct extending obliquely relative to the axis of rotation of the actuating element and directed toward the actuating element, wherein the actuating element has a receiving means for receiving the tool obliquely guided in the guide duct, wherein the guide duct is comprised of an inclined rearward circumferential portion and a front circumferential portion extending parallel to the axis of rotation, wherein the inclined rearward circumferential portion is configured to guide a shaft of the tool and the front circumferential portion is configured to guide the actuating tip of the tool so that the oblique position of the tool relative to the actuating element is predetermined.

2. The connecting device according to claim 1, wherein the assembly element has an outer wall, the guide duct being a throughbore in the outer wall.

3. The connecting device according to claim 1, wherein the guide duct has a length of at least 3 mm.

4. The connecting device according to claim 1, wherein the guide duct has a length of at least 4 mm.

5. The connecting device according to claim 1, wherein the guide duct extends inclined by approximately 30° relative to the axis of rotation of the actuating element.

6. The connecting device according to claim 1, wherein the guide duct extends inclined by up to about 22° relative to the axis of rotation of the actuating element.

7. The connecting device according to claim 1, wherein along the front circumferential portion in a direction of insertion of the tool the guide duct extends approximately parallel to the axis of rotation of the actuating element.

8. The connecting device according to claim 1, wherein the receiving means is a cross recess in alignment with an axis of the guide duct.

9. The connecting device according to claim 8, wherein the cross recess has a front slot in the direction of insertion of the tool, and wherein the front slot is open toward the front in the direction of insertion.

\* \* \* \* \*